(12) United States Patent
Weingärtner

(10) Patent No.: US 11,766,725 B2
(45) Date of Patent: Sep. 26, 2023

(54) DEVICE FOR MAKING A HOLE IN A WORKPIECE

(71) Applicant: AFW Holding GmbH, Kirchham (AT)

(72) Inventor: Dominik Weingärtner, Pettenbach (AT)

(73) Assignee: AFW HOLDING GMBH, Kirchham (AT)

( * ) Notice: Subject to any disclaimer, the term of this patent is extended or adjusted under 35 U.S.C. 154(b) by 45 days.

(21) Appl. No.: 17/264,564

(22) PCT Filed: Jul. 8, 2019

(86) PCT No.: PCT/EP2019/068230
§ 371 (c)(1),
(2) Date: Jan. 29, 2021

(87) PCT Pub. No.: WO2020/025255
PCT Pub. Date: Feb. 6, 2020

(65) Prior Publication Data
US 2021/0323079 A1    Oct. 21, 2021

(30) Foreign Application Priority Data

Jul. 30, 2018 (EP) .................... 18186394

(51) Int. Cl.
*B23B 49/02*    (2006.01)
*B23B 47/32*    (2006.01)
(Continued)

(52) U.S. Cl.
CPC ............. *B23B 49/02* (2013.01); *B23B 47/32* (2013.01); *B23B 41/02* (2013.01); *B23B 49/00* (2013.01)

(58) Field of Classification Search
CPC ......... B23B 41/02; B23B 47/32; B23B 49/00; B23B 49/02; Y10T 408/5653
See application file for complete search history.

(56) References Cited

U.S. PATENT DOCUMENTS

| 1,831,813 A | 11/1931 | Levedahl | |
|---|---|---|---|
| 2,335,614 A * | 11/1943 | Spievak | B23B 47/284 408/81 |
| 2,360,942 A * | 10/1944 | Ellerstein | B25H 1/0078 408/112 |

(Continued)

FOREIGN PATENT DOCUMENTS

| CN | 103658737 A * | 3/2014 | ............. B23B 41/02 |
|---|---|---|---|
| CN | 108057913 A * | 5/2018 | ............. B23B 41/02 |

(Continued)

OTHER PUBLICATIONS

International Search Report issued in International Patent Application No. PCT/EP2019/068230, dated Aug. 1, 2019 (along with English translation).

(Continued)

*Primary Examiner* — Eric A. Gates
(74) *Attorney, Agent, or Firm* — Greenblum & Bernstein, P.L.C.

(57) ABSTRACT

Device for making a hole in a workpiece, including a drilling tool, a supporting apparatus that is or can be assigned to the drilling tool and is configured for supporting the drilling tool on at least one supporting region, wherein the supporting apparatus includes an elongate main body that includes at least two main-body elements, at least one main-body element being mounted so as to be movable relative to at least one additional main-body element in order to change the length measurement of the main body.

13 Claims, 7 Drawing Sheets

(51) Int. Cl.
  *B23B 41/02* (2006.01)
  *B23B 49/00* (2006.01)

(56) References Cited

U.S. PATENT DOCUMENTS

| | | | | | |
|---|---|---|---|---|---|
| 2,454,372 | A | * | 11/1948 | Billeter | B23B 49/02 |
| | | | | | 408/241 R |
| 2,612,793 | A | * | 10/1952 | Timpner | B23Q 35/02 |
| | | | | | 408/112 |
| 2,674,906 | A | * | 4/1954 | Timpner | B23Q 35/02 |
| | | | | | 408/112 |
| 2,994,235 | A | * | 8/1961 | Rise | E04G 17/00 |
| | | | | | 408/112 |
| 3,397,600 | A | * | 8/1968 | Wells | B23B 51/0054 |
| | | | | | 408/112 |
| 3,635,108 | A | * | 1/1972 | Prince | B23B 41/02 |
| | | | | | 408/116 |
| 4,097,176 | A | | 6/1978 | Wanner et al. | |
| 5,071,293 | A | * | 12/1991 | Wells | B23Q 5/263 |
| | | | | | 408/112 |
| 2005/0000732 | A1 | | 1/2005 | Geuvers et al. | |

FOREIGN PATENT DOCUMENTS

| | | | | |
|---|---|---|---|---|
| DE | 102005043399 A1 | * | 3/2007 | B23B 29/027 |
| DE | 102010004765 A1 | | 7/2011 | |
| DE | 102013207815 A1 | * | 10/2014 | B23B 49/00 |
| EP | 0625394 A1 | * | 11/1994 | |
| FR | 2765821 A1 | * | 1/1999 | B23B 49/02 |
| JP | H 1-66914 U | | 4/1989 | |

OTHER PUBLICATIONS

Japanese Office Action dated Oct. 18, 2022 in counterpart Japanese Application No. JP2021-504296, together with a translation thereof.

* cited by examiner

DEVICE FOR MAKING A HOLE IN A WORKPIECE

The invention relates to a device for making a hole in a workpiece, comprising an elongate drilling tool.

Corresponding devices are known in principle from the field of the machining of workpieces in a large number of embodiments. The main purpose or function of corresponding devices is making holes in workpieces.

In order to make holes of this kind, corresponding devices typically comprise a drilling tool. The drilling tool typically comprises a drive-side end and an end comprising at least one bit opposite said drive-side end.

When making difficult-to-access holes in workpieces, stable mounting and positioning of the drilling tool and thus accurately making a corresponding hole might be a challenge when the drilling tool has to "overcome" an unsupported free length between its drive-side end and its end comprising at least one corresponding bit.

The object of the invention is to provide a device for making a hole in a workpiece that is improved compared with the above.

The object is achieved by a device according to claim 1. The claims that are dependent thereon relate to possible embodiments of the device.

The device described therein is configured for making one or more holes in a workpiece. The device is in particular configured for making holes in difficult-to-access drilling positions or at difficult-to-access points on a workpiece, i.e. typically at points or positions which are barely accessible or are inaccessible to a milling tool. The device may in particular be configured for making elongate holes, i.e. holes having large length dimensions, i.e. e.g. length dimensions of greater than 10 mm, in elongate workpieces, i.e. in workpieces having large length dimensions, i.e. e.g. length dimensions of greater than 50 mm.

A hole that can be made using the device, which hole can in principle be a blind hole or a through-hole, can therefore be made at difficult-to-access points or positions on a workpiece that is to be provided with a hole. As mentioned above, difficult-to-access points or positions are in particular those points or positions which are barely accessible or are inaccessible to a milling tool.

A hole that can be made using the device may have an elongate geometry. The hole-depth dimensions or the length measurement of a corresponding hole that can be made using the device can clearly be greater than the diameter measurement of the hole. A hole that can be made using the device may therefore be a deep hole.

In principle, holes having any length dimension or depth can be made using the device.

The device is in particular designed for making holes that are centric or eccentric relative to an axis of symmetry or a central axis of an e.g rotationally symmetrical workpiece. The workpiece may be constructed to be hollow-cylindrical or rotationally symmetrical at least in portions, and in its entirety where appropriate. A workpiece in which corresponding holes can be made using the device may therefore be a workpiece that is constructed to be hollow-cylindrical and thus rotationally symmetrical at least in portions, and in its entirety where appropriate. The workpiece may therefore be configured tube-like or tubular, for example.

In principle, holes can also be made in other workpiece constructions or geometries using the device. The device is not limited to making holes in the region of the internal diameter of a workpiece, but the device can also be used to make holes in the region of the external diameter of a workpiece.

Irrespective of its geometry, the workpiece is typically made of a machinable material, i.e. typically a metal, such as steel.

The device comprises a drilling tool for making corresponding holes. The drilling tool may be constructed to be elongate. Any drilling tool by means of which a hole can be made in a workpiece generally comes into consideration as a corresponding drilling tool. The drilling tool may be a deep-hole drill or a single-lip drill; other configurations of the drilling tool are conceivable. The drilling tool typically comprises a drive-side end and an end comprising at least one bit opposite said drive-side end. The drilling tool is therefore provided at one end with a drive interface for the force-transmitting or torque-transmitting coupling to an in particular motorized drive apparatus that generates a driving torque, and is provided at the other end with at least one bit.

The device further comprises a supporting apparatus that is or can be assigned to the drilling tool. The supporting apparatus is configured for supporting the drilling tool at one or more supporting regions formed by the supporting apparatus. Typically, the supporting regions are or can be arranged along the or a longitudinal axis of the drilling tool. The supporting apparatus is therefore in particular configured for supporting the drilling tool via one or more supporting regions that are or can be arranged along the or a longitudinal axis of the drilling tool. Accordingly, the supporting apparatus is in particular configured for longitudinally supporting the drilling tool via corresponding supporting regions that are or can be arranged along the or a longitudinal axis of the drilling tool. As will become clear in the following, the supporting apparatus typically comprises one or more supporting elements, which each form at least one corresponding supporting region.

The supporting apparatus comprises an elongate main body comprising at least two main-body elements. In this case, at least one main-body element is mounted so as to be movable relative to at least one additional main-body element in order to change the length dimension of the main body. The option of changing the length dimension of the main body, which is provided by the movable mounting of at least one main-body element relative to at least one additional main-body element, allows the length of the supporting apparatus to be individually adjusted and therefore also allows the length of the region in which supporting regions for supporting the drilling tool can be formed by means of the supporting apparatus to be individually adjusted.

The movement of a movably mounted main-body element relative to at least one additional, optionally likewise movably mounted main-body element typically includes or constitutes a translational movement component, i.e. a movement component along a translational axis. A corresponding translational axis typically extends in parallel with the longitudinal axis of the drilling tool. The movement of a movably mounted main-body element relative to at least one additional main-body element may for example be a travel movement or a sliding movement.

By means of the above-described multiple-part construction of the main body and the associated option of moving at least one main-body element relative to at least one additional main-body element, a (length) variable option for supporting the drilling tool is provided for a large number of different drilling applications, i.e. in particular for a large number of holes and/or workpieces that differ with regard to their positioning on or in the workpiece and/or with regard to their length measurements. In any case, owing to the option of supporting the drilling tool by means of the supporting apparatus so as to be individually (length) variable as required, stable support or mounting or positioning of the drilling tool and thus accurately making a corresponding hole can be ensured when the drilling tool does not have to "overcome" a long unsupported free length at difficult-to-access drilling positions between its drive-side end and its end comprising at least one corresponding bit.

An improved device for making a hole in a workpiece is therefore provided.

The respective main-body elements can in particular be movable relative to one another between first and second positions, which positions each correlate with certain length measurements of the main body. Therefore, at least one main-body element can be mounted so as to be movable relative to at least one additional main-body element between a first position, i.e. e.g. an extended position which correlates with a first length measurement of the main body, and at least one additional position, i.e. e.g. a retracted position which correlates with an additional length measurement of the main body that is different from the first length measurement of the main body. It is of course possible for respective main-body elements to also be movable into intermediate positions between respective first and second positions. Respective main-body elements may therefore optionally be continuously movable between respective first and second positions.

The main body may be constructed so as to be telescopically extendable. Therefore, the main body may form a telescopic assembly comprising a plurality of telescopic elements or may form an integral part of such a telescopic assembly. In this case, a first main-body element may form or be coupled to a first telescopic element, and at least one additional main-body element may form or be coupled to an additional telescopic element that is mounted so as to be movable in a telescopically guided manner relative to the first telescopic element.

At least one supporting element forming a supporting region for the drilling tool may be arranged or formed on at least one main-body element. Therefore, respective main-body elements can each be equipped with at least one corresponding supporting element. At the same time, it is also possible for individual main-body elements not to be equipped with a corresponding supporting element. The supporting effect that can be provided by means of the supporting apparatus can therefore be adjusted in a targeted manner by the number and arrangement of respective supporting elements. In an exemplary configuration, at least one supporting element forming a supporting region for the drilling tool may be arranged or formed on the or a first main-body element and on at least one additional main-body element in each case.

A relevant supporting element may e.g. be formed by or comprise an open or closed receiving opening for the drilling tool. The dimensions of a corresponding receiving opening, i.e. in particular the cross-sectional geometry thereof, are typically adapted to the dimensions of the drilling tool, in particular to the cross-sectional geometry thereof, such that the drilling tool can be supported in a stable manner. When a relevant receiving opening is designed to be closed, the drilling tool can penetrate a relevant receiving opening at least in portions, optionally completely.

It is conceivable to arrange or form respective supporting elements on respective main-body elements so as to be detachable (without being damaged or destroyed), and this provides additional degrees of freedom with regard to a supporting effect that can be individually adapted. The detachable arrangement or formation of supporting elements on main-body elements may e.g. be implemented by the form-fitting and/or force-locked interaction between supporting-element-side fastening elements and main-body-element-side fastening elements, which are in particular corresponding. Corresponding fastening elements may e.g. be formed by or comprise latching or screwed fastening elements. In principle, fastening options other than form-fitting and/or force-locked fastening options, i.e. magnetic fastening options, for example, are also conceivable.

The main body may be formed as a hollow profile at least in portions, optionally in its entirety. Accordingly, respective main-body elements may also be formed as a hollow profile at least in portions, optionally in their entirety. The main body or respective main-body elements therefore have an internal volume in which one or more functional components of the supporting apparatus can be arranged or formed.

Forming the main body or respective main-body elements as a hollow profile is particularly expedient for the above-mentioned telescopically extendable embodiment of the main body. A telescopic assembly comprising a first telescopic element and at least one additional telescopic element that is mounted so as to be telescopically movable relative to the first telescopic element may accordingly e.g. be arranged or formed within the main body formed as a hollow profile. The above-mentioned option of the main body forming a component of a telescopic assembly comprising a plurality of telescopic elements can therefore be implemented such that respective telescopic elements are arranged or formed within the hollow profile. In this case, a first telescopic element can be coupled, in particular movably coupled, to a first main-body element, and at least one additional telescopic element can be coupled, in particular movably coupled, to at least one additional main-body element. The coupling or movable coupling of respective main-body elements and respective telescopic elements can e.g. be produced by the form-fitting and/or force-locked and/or bonded interaction of main-body-element-side coupling elements and telescopic-element-side coupling elements, which are in particular corresponding. Corresponding coupling elements may e.g. be formed by or comprise latching or screwed fastening elements. In principle, coupling options other than form-fitting and/or force-locked coupling options, i.e. magnetic coupling options, for example, are also conceivable.

The device may comprise at least one preloading apparatus that is or can be assigned to the main body and is configured to generate a preloading force that moves a movably mounted main-body element relative to at least one additional main-body element. The preloading force can have the effect that at least one movably mounted main-body element is always moved in the distal direction, i.e, typically always in the direction of the end of the drilling tool provided with respective cutting elements, and this ensures that the drilling tool is reliably supported along the longitudinal axis thereof. The preloading apparatus may e.g, be formed by or comprise an accordingly preloaded spring.

In this context, it should be mentioned that an in particular motorized drive apparatus is or can also be assigned to the device, which apparatus is configured to generate a force that moves a movably mounted main-body element relative to at least one additional main-body element. Movements of main-body elements can thus also be controlled by a motorized drive. In particular, in this context, it is also conceivable to implement movement or distance sensors, which can detect an accurate longitudinal deflection of the main body or respective main-body elements. Therefore, the term "preloading apparatus" may optionally also include a corresponding drive apparatus; a corresponding preloading apparatus may therefore also include a corresponding drive apparatus where appropriate.

The supporting apparatus or the device may be fastened to a machining head that is or can be assigned to the drilling tool, in particular so as to be detachable (without being damaged or destroyed). In order to fasten the supporting apparatus or the device to a corresponding machining head, the supporting apparatus may comprise a fastening body that is arranged or formed on the main body, in particular on a main-body element, which fastening body is or can be fastened to a corresponding fastening element of the machining head, in particular so as to be detachable (without being damaged or destroyed), by means of an in particular mechanical fastening element. The fastening of the fastening body to the machining head may e.g, be implemented by the form-fitting and/or force-locked interaction between at least one fastening-body-side fastening element and at least one machining-head-side fastening element, which are in particular corresponding. Corresponding fastening elements that interact in a form-fitting manner may e.g. be configured by or comprise a form-fitting element on the part of the fastening body, i.e. a dovetail-like or dovetail-shaped fastening portion, for example, and a form-fitting element of the machining head that corresponds thereto, i.e. a corresponding receptacle for the dovetail-like or dovetail-shaped fastening portion, for example. Corresponding fastening elements that interact in a force-locked manner may e.g. be configured by or comprise screwed fastening elements.

A corresponding machining head is typically equipped with an in particular motorized drive apparatus that is or can be coupled to the drive-side end of the drilling tool. A corresponding machining head therefore typically comprises at least one force-transmission element that is or can be coupled to the drilling tool, by means of which element a drive force that is or can be generated by a corresponding drive apparatus can be transmitted to the drilling tool.

It is applicable to all the embodiments that the free end of the main-body element forming the free end of the main body can be formed by or comprise a stop element which is e.g. formed by a stop surface. During operation of the device, the stop element can abut a counter-stop element of the workpiece, for example formed by a counter-stop surface, and can thus ensure that the main body is supported in a stable manner, which can have a positive effect on the support of the drilling tool. For the example of a hollow-cylindrical workpiece, a corresponding counter-stop element can e.g. be formed by a radial step formed in the interior volume of the workpiece.

The invention also relates to a supporting apparatus for a device as described. The supporting apparatus is configured for supporting a drilling tool at at least one supporting region and comprises an elongate main body comprising at least two main-body elements, at least one main-body element being mounted so as to be movable relative to at least one additional main-body element in order to change the length measurement of the main body. All the embodiments relating to the device apply by analogy to the supporting apparatus.

The invention further relates to a machining center for the machining of a workpiece, comprising at least one device as described. All the embodiments relating to the device apply by analogy to the machining center. The machining center typically comprises at least one machining head. The supporting apparatus is typically fastened to a machining head that is or can be assigned to the drilling tool or the device, in particular so as to be detachable (without being damaged or destroyed). The machining head is typically movably mounted on a mounting apparatus of the machining center in at least one translational and/or rotational degree of freedom of movement. The machining center may comprise a magazine for tools, i.e. in particular for drilling tools, in which tools, i.e. in particular for drilling tools, can be mounted. Tools can be inserted into and/or removed from a corresponding magazine in an automated manner, e.g. by means of a suitable handling apparatus, such as a handling robot.

Lastly, the invention relates to a method for making a hole, for example an elongate blind hole, in a workpiece. According to the method, a device as described is operated or used to make the hole. All the embodiments relating to the device apply by analogy to the method.

An exemplary embodiment of the invention will be explained in greater detail in the following in conjunction with the drawings, in which:

FIG. 1-6 are each a schematic view of a device 1 according to a first exemplary embodiment. The device 1 is in a side view in FIGS. 1 and 3, in top view in FIGS. 2 and 4, in a front view in FIG. 5, and in a rear view in FIG. 6.

FIG. 7 is a schematic perspective view of a device 1 according to another exemplary embodiment in an operating state.

Figure 7:
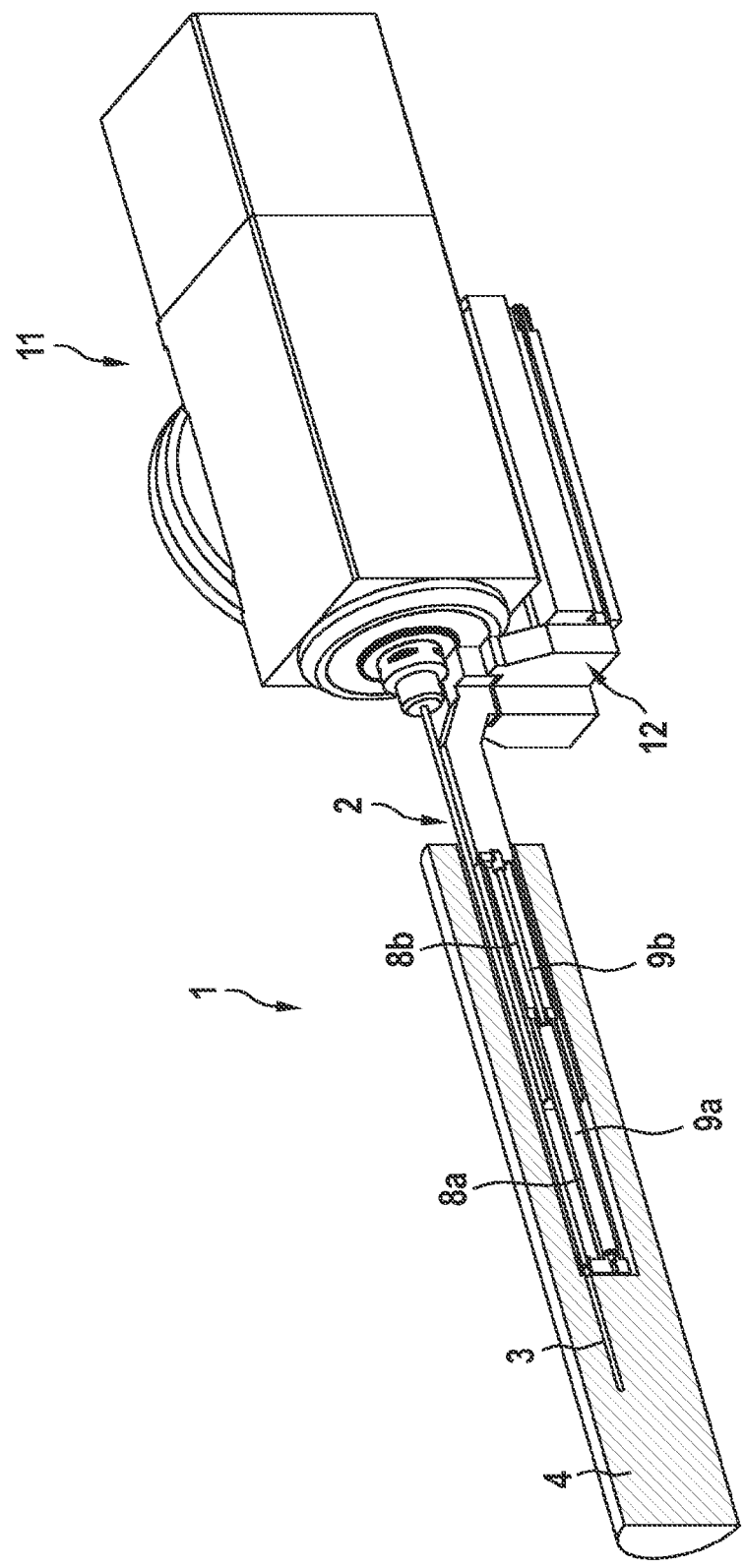
FIG. 7 is a schematic view of a device according to another exemplary embodiment.

The device 1 is configured for making one or more holes 3 in a workpiece 4 (cf. FIG. 7). The device 1 can be used to make holes 3 in difficult-to-access drilling positions, i.e. at points or positions which can barely be reached or cannot be reached by a milling tool. In particular, the device 1 can be used to make elongate holes 3, i.e. holes 3 having large length measurements, i.e. e.g. length measurements of greater than 10 mm, in elongate workpieces 4, i.e. in workpieces 4 having large length measurements, i.e. e.g. length measurements of greater than 50 mm. The hole-depth dimensions or the length measurement of the holes 3 that can be made using the device 1 can clearly be greater than the diameter measurement of the holes 3. The holes 3 that can be made using the device 1 may therefore be deep holes.

The device 1 may be designed for making holes 3 that are centric or eccentric relative to an axis of symmetry or a central axis of a rotationally symmetrical workpiece 4, in a hollow-cylindrical workpiece 4 (cf. FIG. 7). A workpiece 4 in which corresponding holes 3 can be made using the device 1 may therefore be a workpiece 4 that is constructed to be hollow-cylindrical and thus rotationally symmetrical (cf. FIG. 7). The workpiece 4 may therefore be tube-like or tubular, for example. However, holes 3 can also be made in other workpiece constructions or geometries using the device 1. The device 1 is not limited to making holes 3 in the region of the internal diameter of a workpiece 4, but the device 1 can also be used to make holes 3 in the region of the external diameter of a workpiece 4.

Irrespective of its geometry, the workpiece 4 is typically made of a machinable material, i.e. typically a metal, such as steel.

The device 1 comprises a drilling tool 2 for making corresponding holes 3. The drilling tool 2 may e.g. be a deep-hole drill or a single-lip drill; other configurations of the drilling tool 2 are conceivable. The drilling tool 2 comprises a drive-side end 2b and an end 2a comprising at least one bit (not shown) opposite said drive-side end. The drilling tool 2 is therefore provided at one end with a drive interface for the force-transmitting or torque-transmitting coupling to an in particular motorized drive apparatus (not shown) that generates a driving torque, and is provided at the other end with at least one bit.

Figure 1:
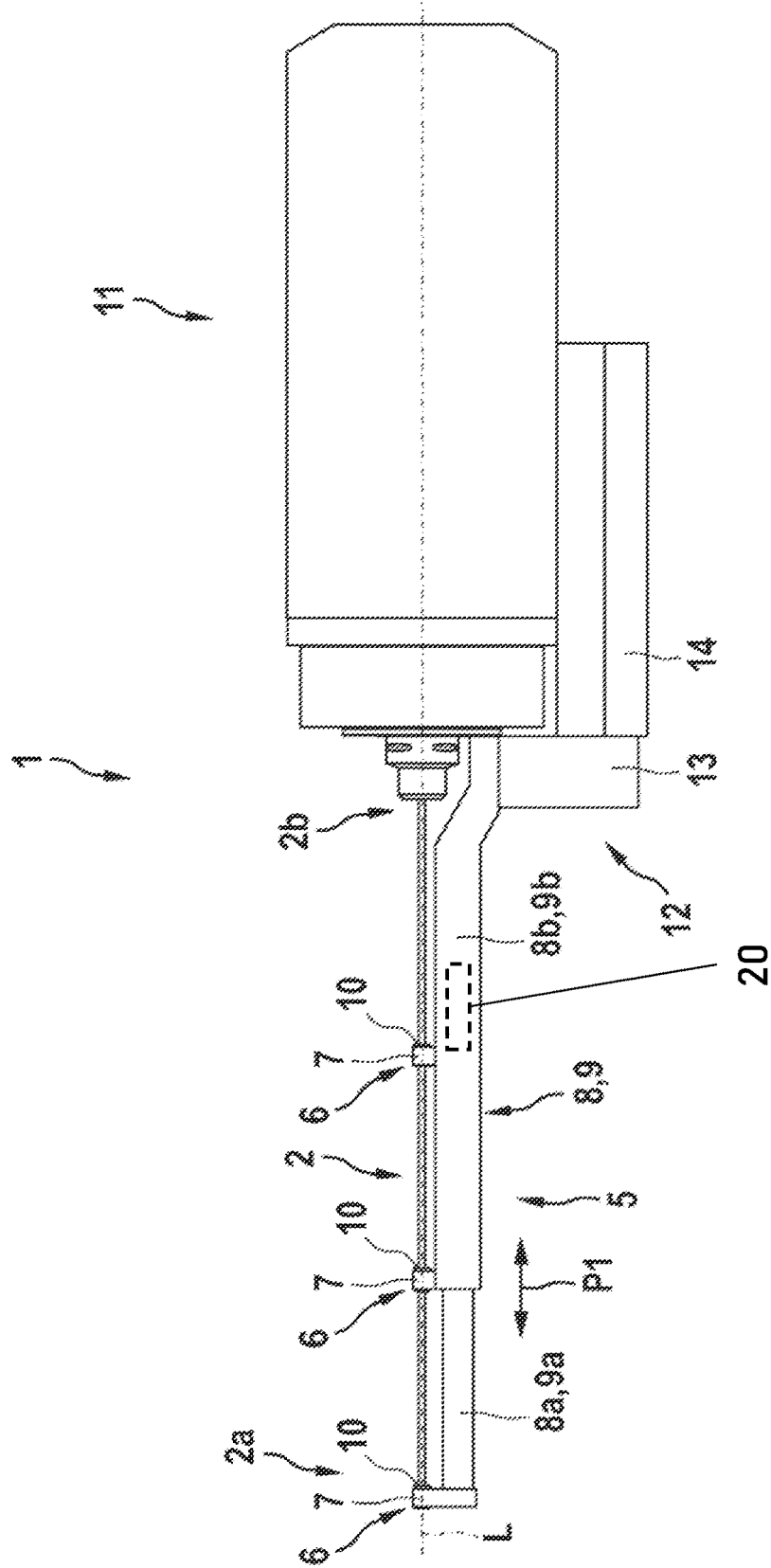
FIG. 1-6 are each a schematic view of a device 1 according to a first exemplary embodiment. The device 1 is in a side view in FIG. 1-4, in a front view in FIG. 5, and in a rear view in FIG. 6.
Figure 2:
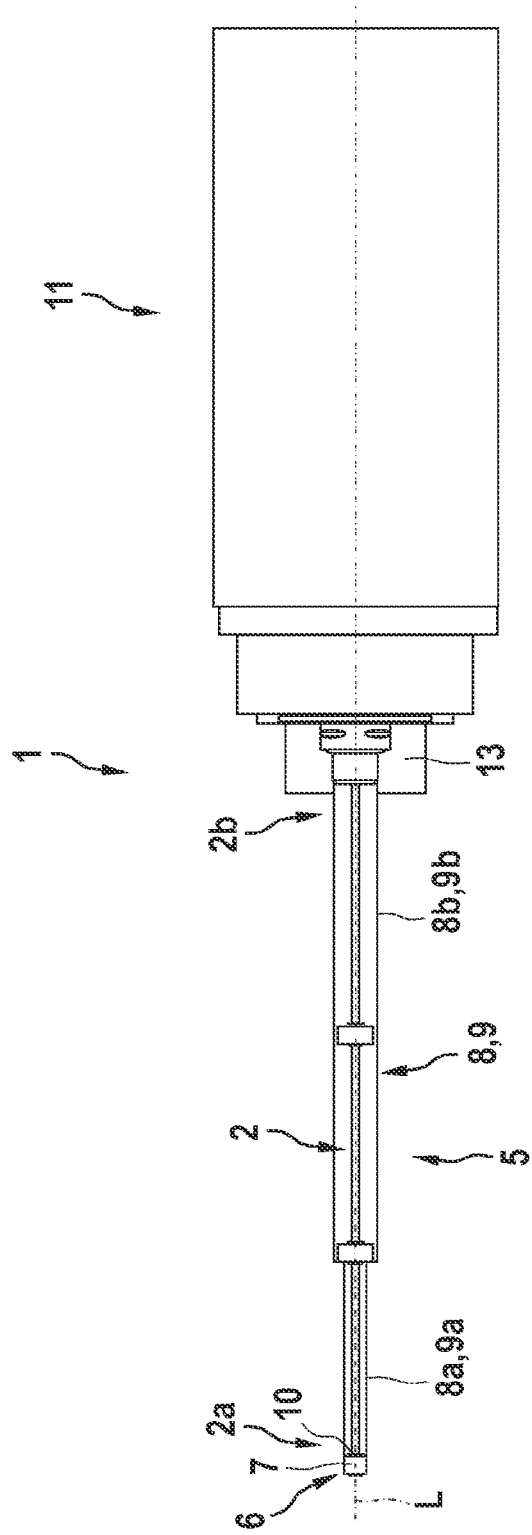
Figure 3:
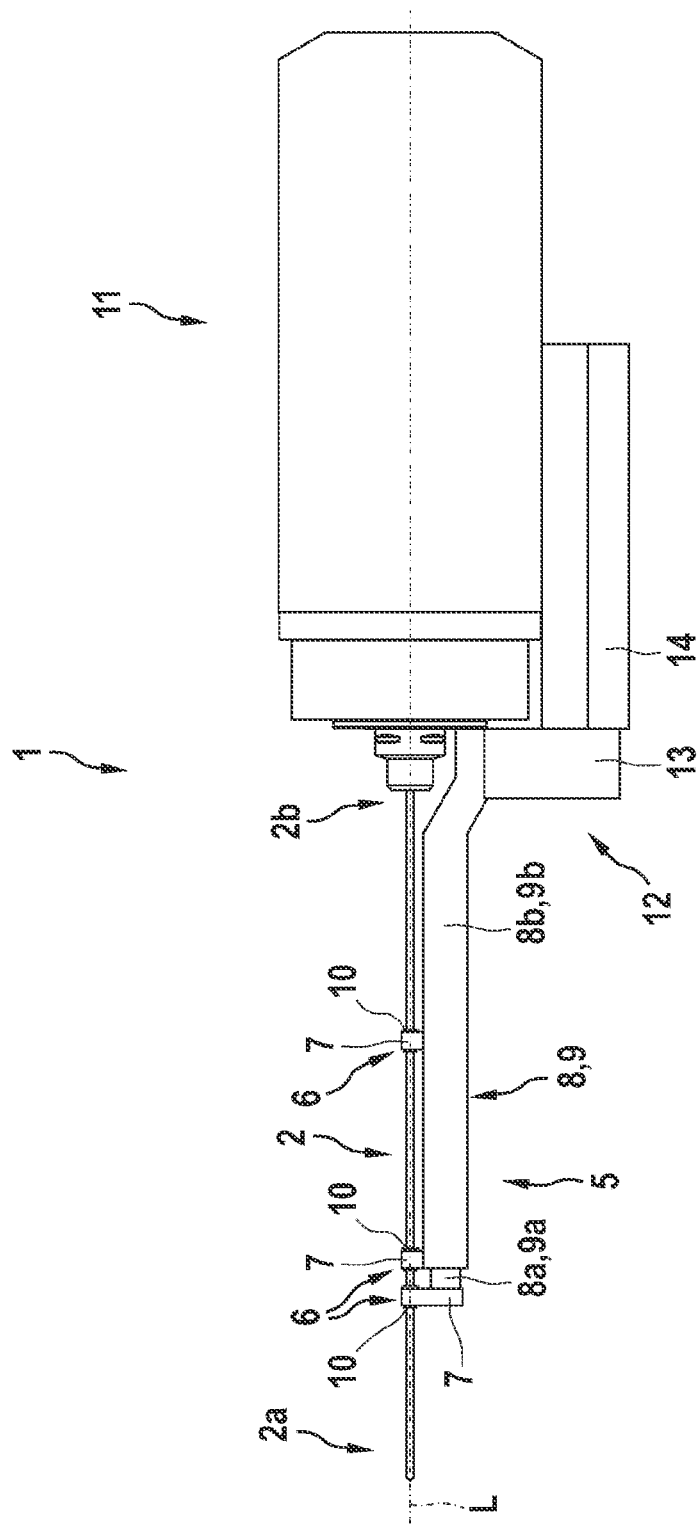
Figure 4:
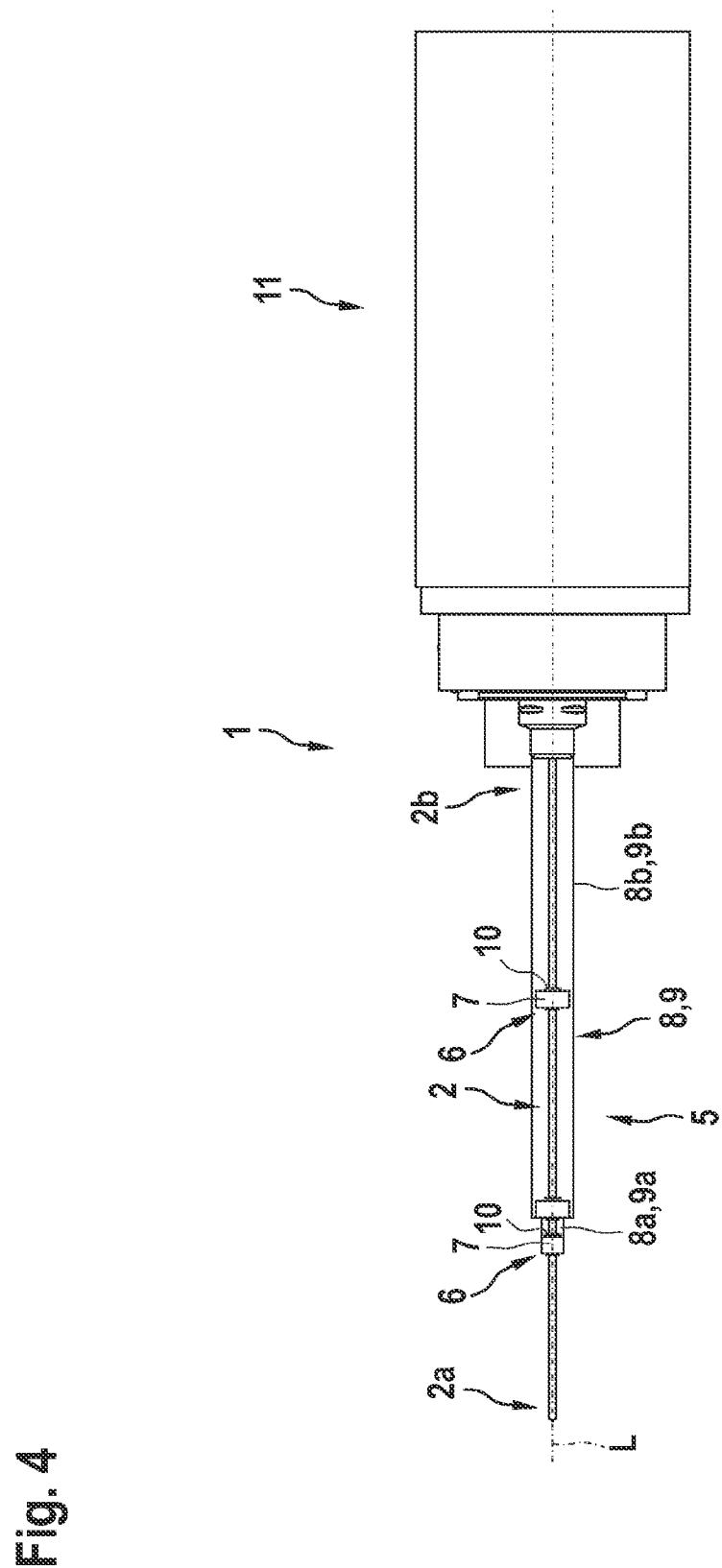
Figure 5:
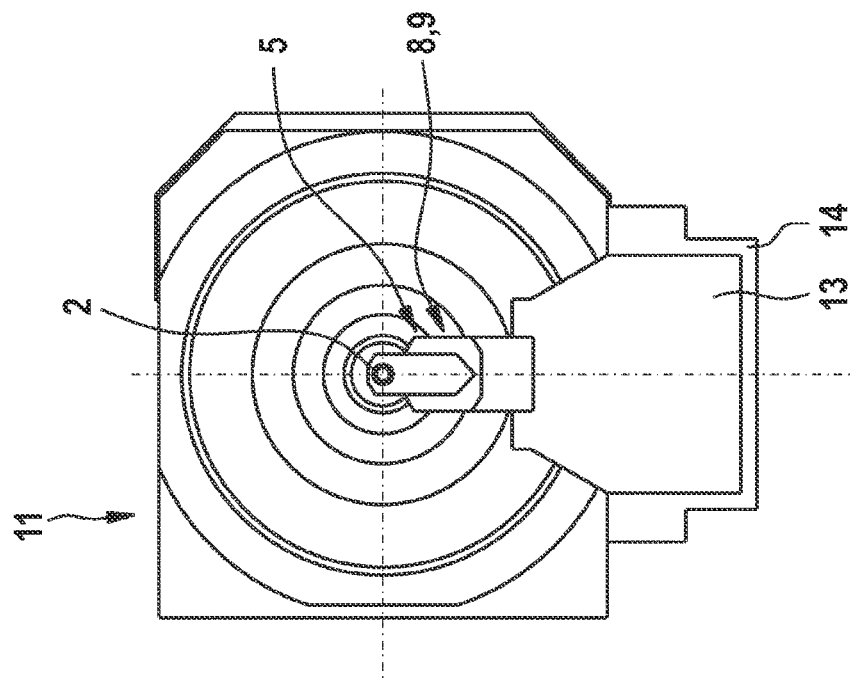

The device 1 further comprises a supporting apparatus 5 that is or can be assigned to the drilling tool 2. The supporting apparatus 5 is configured for supporting the drilling tool 2 at a plurality of supporting regions 6 formed by the supporting apparatus 5. With reference to FIGS. 1 and 2, it is clear that the supporting regions 6 are arranged along the longitudinal axis L of the drilling tool 2. The supporting apparatus 5 is therefore configured for supporting the drilling tool 2 via a plurality of supporting regions 6 arranged along the longitudinal axis L of the drilling tool 2 and thus for longitudinally supporting the drilling tool 2. As will become clear in the following, the supporting apparatus 5 comprises a plurality of supporting elements 7, which each form at least one corresponding supporting region 6.

Figure 6:
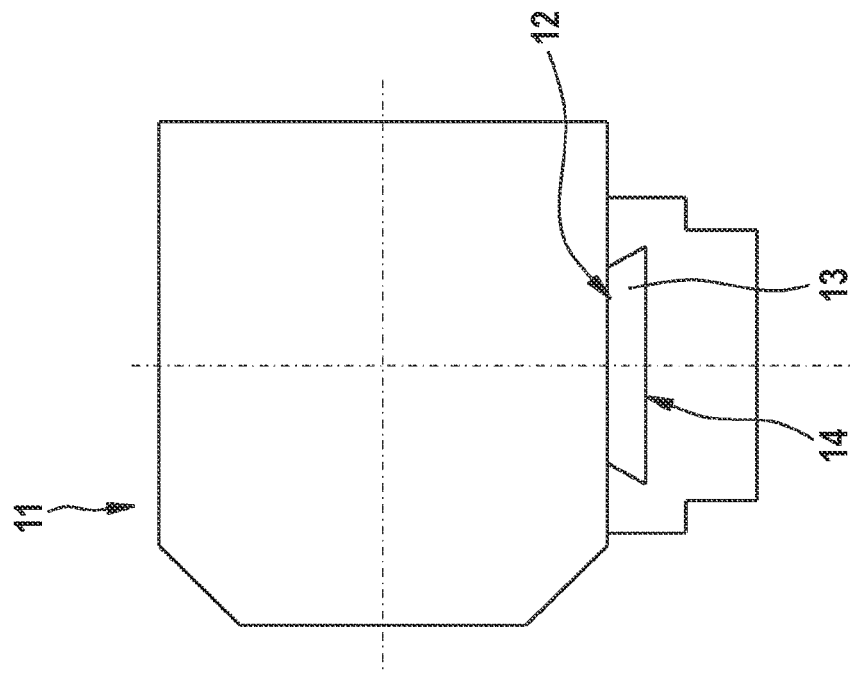

The supporting apparatus 5 or the device 1 is fastened to a machining head 11 that is or can be assigned to the drilling tool 2, in particular so as to be detachable (without being damaged or destroyed). For fastening the supporting apparatus 5 or the device 1 to the machining head 11, the supporting apparatus 5 comprises a fastening body 12 that is arranged or formed on the main body 8, in particular on the second main-body element 8b, and can be fastened to a corresponding fastening element 14 of the machining head 11 by means of a fastening element 13, in particular so as to be detachable (without being damaged or destroyed). In the embodiments shown in the drawings, by way of example, the fastening body 12 is fastened to the machining head 11 by the form-fitting interaction of the fastening-body-side fastening element 13 and a corresponding machining-head-side fastening element 14. The fastening elements 13, 14 that interact in a form-fitting manner are formed by a form-fitting element on the part of the fastening body 12, i.e. a dovetail-like or dovetail-shaped fastening portion, for example, and a form-fitting element of the machining head 11 that corresponds thereto, i.e. a corresponding fastening receptacle for the dovetail-like or dovetail-shaped fastening portion (cf. FIG. 6).

The machining head 11 is typically equipped with an in particular motorized drive apparatus (not shown) that is or can be coupled to the drive-side end of the drilling tool 2. The machining head 11 therefore typically comprises a force-transmission element (not provided with a reference character) that is or can be coupled to the drilling tool 2, by means of which element a drive force that is or can be generated by a corresponding drive apparatus can be transmitted to the drilling tool 2.

The supporting apparatus 5 comprises an elongate main body 8 that comprises two main-body elements 8a, 8b. Even though only two main-body elements 8a, 8b are shown in the drawings, the main body 8 could also comprise more than two main-body elements 8a, 8b. In this case, a first main-body element 8a is mounted so as to be movable relative to a second main-body element 8b in order to change the length dimension of the main body 8. The option of changing the length dimension of the main body 8, which is provided by the movable mounting of the first main-body element 8a relative to the second main-body element 8b, allows the length of the supporting apparatus 5 to be individually adjusted and therefore also allows the length of the region in which supporting regions 6 for supporting the drilling tool 2 can be formed by means of the supporting apparatus 5 to be individually adjusted.

The movement of the movably mounted first main-body element 8a relative to the second main-body element 8b, as indicated by the arrow P1 in FIGS. 1 and 2, includes or constitutes a translational movement component, i.e. a movement component along a translational axis. The translational axis extends in parallel with the longitudinal axis L of the drilling tool 2. The movement of the movably mounted first main-body element 8a relative to the second main-body element 8b may be a travel movement or a sliding movement.

By means of the multiple-part construction of the main body 8 and the associated option of moving the first main-body element 8a relative to the second main-body element 8b, a (length) variable option for supporting the drilling tool 2 is provided for a large number of different drilling applications, i.e. in particular for a large number of holes 3 and/or workpieces 4 that differ with regard to their positioning or length measurements. Owing to the option of supporting the drilling tool 2 by means of the supporting apparatus 5 so as to be individually (length) variable as required, stable support or mounting of the drilling tool 2 and thus accurately making corresponding holes 3 can be ensured when the drilling tool 2 does not have to "overcome" a long unsupported free length between its drive-side end 2b and its end 2a comprising at least one corresponding bit.

At least one supporting element 7 forming a supporting region 6 for the drilling tool 2 is arranged or formed on each of the main-body elements 8a, 8b. Therefore, the main-body elements 8a, 8b are each equipped with at least one corresponding supporting element 7. Even though it is not shown in the drawings, it is also possible for a main-body element 8a, 8b not to be equipped with a corresponding supporting element 7. The supporting effect that can be achieved by means of the supporting apparatus 5 can therefore be adjusted in a targeted manner by the number and arrangement of respective supporting elements 7.

In the exemplary embodiments shown in the Figures, by way of example, respective supporting elements 7 are formed by a closed receiving opening 10 for the drilling tool 2 or respective supporting elements 7 each comprise a corresponding receiving opening 10. The dimensions of the respective receiving openings 10, i.e. in particular the cross-sectional geometry thereof, are typically adapted to the dimensions of the drilling tool 2, in particular to the cross-sectional geometry thereof, such that the drilling tool 2 can be supported in a stable manner. In the closed configuration of respective receiving openings 10 shown in the Figures, the drilling tool 2 penetrates the receiving openings 10.

With reference to FIG. 1-4, it is clear that the first main-body element 8a is movable relative to the second main-body element 8b between a first and a second position, which positions each correlate with certain length measurements of the main body 8. Therefore, the first main-body element 8a is mounted so as to be movable relative to the second main-body element 8b between a first position (shown in FIGS. 1 and 2), i.e. an extended position, which correlates with a first length measurement of the main body 8, and a position (shown in FIGS. 3 and 4), i.e. a retracted position, which correlates with a length measurement of the main body 8 that is different from, i.e. shorter than, the first length measurement of the main body 8. It is of course possible for the first main-body element 8a to also be movable into intermediate positions between the first and second position. The first main-body element 8*a* may therefore optionally be continuously movable between the first and the second position.

In the exemplary embodiments shown in the drawings, the main body 8 is configured so as to be telescopically extendable by way of example. The main body 8 therefore comprises a telescopic assembly 9 comprising two telescopic elements 9*a*, 9*b*. In this case, the first main-body element 8*a* forms the first telescopic element 9*a* and the second main-body element 8*b* forms a second telescopic element 9*b* that is mounted so as to be telescopically movable relative to the first telescopic element 9*a*.

It is conceivable to arrange or form respective supporting elements 7 on respective main-body elements 8*a*, 8*b* so as to be detachable (without being damaged or destroyed), and this provides additional degrees of freedom with regard to a supporting effect that can be individually adapted. The detachable arrangement or configuration of the supporting elements 7 on main-body elements 8*a*, 8*b* may e.g. be implemented by the form-fitting and/or force-locked interaction between supporting-element-side fastening elements (not shown) and main-body-element-side fastening elements (not shown), which are in particular corresponding. Corresponding fastening elements may e.g. be formed by or comprise latching or screwing fastening elements. In principle, fastening options other than form-fitting and/or force-locked fastening options, i.e. magnetic fastening options, for example, are also conceivable.

As can be seen from the exemplary embodiment shown in FIG. 7, the main body 8 may be formed as a hollow profile at least in portions, optionally in its entirety. Accordingly, the main-body elements 8*a*, 8*b* may also be formed as a hollow profile at least in portions, optionally in their entirety. The main body 8 or respective main-body elements 8*a*, 8*b* can therefore have an internal volume in which one or more functional components of the supporting apparatus 5 can be arranged or formed.

Forming the main body 8 or the main-body elements 8*a*, 8*b* as a hollow profile is expedient for the telescopically extendable embodiment of the main body 8. A telescopic assembly 8 comprising two telescopically mounted telescopic elements 9*a*, 9*b* that are movable relative to one another can be arranged or formed within the main body 8 formed as a hollow profile, as shown in FIG. 7. The option of the main body 8 forming a component of a telescopic assembly 9 comprising a plurality of telescopic elements 9*a*, 9*b* can therefore be implemented such that respective telescopic elements 9*a*, 9*b* are arranged or formed within the hollow profile. In this case, a first telescopic element 9*a* may be coupled to the first main-body element 8*a* and the second telescopic element 9*b* may be coupled to the second main-body element 8*b*. The coupling of respective main-body elements 8*a*, 8*b* and respective telescopic elements 9*a*, 9*b* can e.g. be produced by the form-fitting and/or force-locked and/or bonded interaction of main-body-element-side coupling elements (not shown) and telescopic-element-side coupling elements (not shown), which are in particular corresponding. Corresponding coupling elements may e.g. be formed by or comprise latching or screwed fastening elements. In principle, coupling options other than form-fitting and/or force-locked coupling options, i.e. magnetic coupling options, for example, are also conceivable.

It applies to all the embodiments that the device 1 may comprise a preloading apparatus 20 (or preloader) that is or can be assigned to the main body 8 and is configured to generate a preloading force that moves the movably mounted first main-body element 8*a* relative to the second main-body element 8*b*. The preloading force can have the effect that the first main-body element 8*a* is always moved in the distal direction, i.e. typically always in the direction of the (front) end 2*a* of the drilling tool 2 provided with respective cutting elements, and this ensures that the drilling tool 2 is reliably supported along the longitudinal axis L thereof. The preloading apparatus 20 (or preloader) may e.g. be formed by or comprise an accordingly preloaded spring.

In this context, it should be mentioned that an in particular motorized drive apparatus (not shown) is or can also be assigned to the device 1, which apparatus is configured to generate a force that moves the movably mounted first main-body element 8*a* relative to the second main-body element 8*b*. Movements of the main-body elements 8*a*, 8*b* can thus also be controlled by a motorized drive. In particular, in this context, it is also conceivable to implement movement or distance sensors, which can detect an accurate longitudinal deflection of the main body 8 or the main-body elements 8*a*, 8*b*.

It is also applicable to all the embodiments that the main-body element 8*a* forming the free end of the main body 8 can be formed by or comprise a stop element (not shown) which is e.g. formed by a stop surface. During operation of the device 1, as shown in FIG. 7, the stop element can abut a counter-stop element of the workpiece 4, for example formed by a counter-stop surface, and can thus ensure that the main body 8 is supported in a stable manner, which can have a positive effect on the support of the drilling tool 2. For the example of a hollow-cylindrical workpiece 4, as shown in FIG. 7, a corresponding counter-stop element can e.g. be formed by a radial step formed in the interior volume of the workpiece 4.

The device 1 can be used in a machining center (not shown) for the machining of a workpiece 4. The machining center comprises at least one machining head 11. The supporting apparatus 5 or the device 1 is typically fastened to the machining head 11, in particular so as to be detachable (without being damaged or destroyed). The machining head 11 is typically movably mounted on an e.g. flange-like mounting apparatus (not shown) of the machining center in at least one translational and/or rotational degree of freedom of movement. The machining center may comprise a magazine for tools, i.e. in particular for drilling tools 2, in which tools, i.e. in particular drilling tools 2, can be mounted, Workpieces can be inserted into and/or removed from a corresponding magazine in an automated manner, e.g. by means of a suitable handling apparatus, such as a handling robot.

By means of the device 1, a method for making a hole 3 in a workpiece 4 can be implemented. According to the method, the device 1 is operated for making a hole 3 in the workpiece 4.

The invention claimed is:

1. Device for making a hole in a workpiece in a machining center for the machining of the workpiece, the device comprising:
   a drilling tool,
   a machining head assigned to the drilling tool,
   a supporting apparatus that is or can be assigned to the drilling tool and is configured for supporting the drilling tool on at least one supporting region,
   the supporting apparatus comprising an elongate main body that comprises at least two main-body elements, at least one main-body element being mounted so as to be movable relative to at least one additional main-body element in order to change the length measurement of the main body, wherein the supporting apparatus is detachably fastened to the machining head, wherein the supporting apparatus comprises a fastening body that is arranged or formed on the main-body element and comprises at least one fastening element, wherein the fastening body is fastenable to at least one machining head fastening element via the at least one fastening element, wherein the at least one fastening element is configured for implementing a form-fit with the at least one machining head fastening element, and wherein the at least one fastening element of the fastening body comprises a dove-tail-shaped fastening portion and the at least one machining head fastening element comprises a corresponding receptacle for the dove-tail-shaped fastening portion, or vice versa.

2. Device according to claim 1, wherein at least one main-body element is mounted so as to be movable relative to at least one additional main-body element between a first position, which correlates with a first length measurement of the main body, and at least one additional position, which correlates with an additional length measurement of the main body that is different from the first length measurement of the main body.

3. Device according to claim 1, wherein the main body is constructed so as to be telescopically extendable, a first main-body element forming or being coupled to a first telescopic element, and at least one additional main-body element forming or being coupled to an additional telescopic element that is mounted so as to be telescopically movable relative to the first telescopic element.

4. Device according to claim 1, wherein at least one support forming the at least one supporting region for the drilling tool is arranged or formed on at least one main-body element.

5. Device according to claim 4, wherein at least one support forming the at least one supporting region for the drilling tool is arranged or formed both on the first main-body element and on at least one additional main-body element.

6. Device according to claim 4, wherein a support of the at least one support is formed by an open or closed receiving opening for the drilling tool.

7. Device according to claim 1, wherein the main body is formed as a hollow profile at least in portions.

8. Device according to claim 7, wherein a telescopic assembly comprising a first telescopic element and at least one additional telescopic element that is mounted so as to be movable in a telescopically guided manner relative to the first telescopic element is arranged or formed within the main body formed as a hollow profile.

9. Device according to claim 8, wherein the first telescopic element is coupled to a first main-body element and the at least one additional telescopic element is coupled to at least one additional main-body element.

10. Device according to claim 1, the device comprising a preloader that is assigned to the main body and is configured to generate a preloading force that moves a movably mounted main-body element relative to at least one additional main-body element.

11. Machining center comprising at least one device according to claim 1.

12. Method for making a hole in a workpiece, wherein a device according to claim 1 is used to make the hole in the workpiece.

13. Supporting apparatus that is assigned or assignable to a drilling tool having a machining head, and is configured for supporting the drilling tool on at least one supporting region, the supporting apparatus comprising:

an elongate main body that comprises at least two main-body elements, at least one main-body element being mounted so as to be movable relative to at least one additional main-body element in order to change the length measurement of the main body, wherein the supporting apparatus is detachably fastenable to the machining head, wherein the supporting apparatus comprises a fastening body that is arranged or formed on the main-body element and comprises at least one fastening element, wherein the fastening body is fastenable to at least one machining head fastening element via the at least one fastening element, wherein the at least one fastening element is configured for implementing a form-fit with the at least one machining head fastening element, and wherein the at least one fastening element of the fastening body comprises a dove-tail-shaped fastening portion for fastening to the at least one machining head fastening element having a corresponding receptacle for the dove-tail-shaped fastening portion, or vice versa.

* * * * *